US012610395B2

(12) United States Patent
Lehti et al.

(10) Patent No.: US 12,610,395 B2
(45) Date of Patent: Apr. 21, 2026

(54) MANAGING LISTEN BEFORE TALK

(71) Applicant: Nokia Technologies Oy, Espoo (FI)

(72) Inventors: Arto Lehti, Massy (FR); Anna Pantelidou, Massy (FR); Volker Pauli, Munich (DE)

(73) Assignee: Nokia Technologies Oy, Espoo (FI)

( * ) Notice: Subject to any disclaimer, the term of this patent is extended or adjusted under 35 U.S.C. 154(b) by 297 days.

(21) Appl. No.: 18/548,182

(22) PCT Filed: Mar. 2, 2022

(86) PCT No.: PCT/FI2022/050134
    § 371 (c)(1),
    (2) Date: Aug. 28, 2023

(87) PCT Pub. No.: WO2022/207965
    PCT Pub. Date: Oct. 6, 2022

(65) Prior Publication Data
    US 2024/0147528 A1    May 2, 2024

(30) Foreign Application Priority Data
    Mar. 31, 2021    (FI) ..................................... 20215393

(51) Int. Cl.
    *H04W 74/00*        (2009.01)
    *H04W 74/0808*      (2024.01)
(52) U.S. Cl.
    CPC ..... *H04W 74/0808* (2013.01); *H04W 74/002* (2013.01)

(58) Field of Classification Search
    None
    See application file for complete search history.

(56) References Cited

U.S. PATENT DOCUMENTS

| | | | |
|---|---|---|---|
| 10,594,456 | B2 | 3/2020 | Park et al. |
| 10,798,724 | B2 | 10/2020 | Anderson et al. |
| 2018/0152966 | A1 | 5/2018 | Goldhamer |

(Continued)

FOREIGN PATENT DOCUMENTS

| | | |
|---|---|---|
| CA | 3094877 A1 | 3/2021 |
| KR | 20210007886 A | 1/2021 |

(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

(Continued)

*Primary Examiner* — Jenkey Van
(74) *Attorney, Agent, or Firm* — Barta Jones, PLLC

(57)                ABSTRACT
Examples of the present disclosure relate to management of Listen-Before-Talk. Certain examples provide a centralized unit 210 of an access node 120 for use in a network comprising at least the centralized unit 210 and a distributed unit 220, the centralized unit 120 comprising means configured to: receive information 301 indicative of a quality of a channel; and cause an adaptation 302 of a Listen-Before-Talk state 501 of at least one network node based 220/110, at least in part, on the received information 301.

3 Claims, 6 Drawing Sheets

(56)                References Cited

U.S. PATENT DOCUMENTS

| | | | |
|---|---|---|---|
| 2019/0373635 A1 | 12/2019 | Yang et al. | |
| 2020/0229241 A1 | 7/2020 | Jeon et al. | |
| 2020/0275485 A1 | 8/2020 | Babaei et al. | |
| 2020/0296772 A1 | 9/2020 | Babaei et al. | |
| 2020/0314906 A1* | 10/2020 | Goyal | H04B 7/0696 |
| 2022/0272752 A1* | 8/2022 | Zhang | H04W 76/18 |
| 2022/0295550 A1* | 9/2022 | Luo | H04W 74/002 |
| 2023/0217490 A1* | 7/2023 | Li | H04L 5/0053 |
| | | | 370/329 |
| 2023/0345532 A1* | 10/2023 | Khirallah | H04W 74/0816 |
| 2023/0361966 A1* | 11/2023 | Bhamri | H04W 74/0808 |
| 2024/0032093 A1* | 1/2024 | Pan | H04W 74/0808 |

FOREIGN PATENT DOCUMENTS

| | | | |
|---|---|---|---|
| WO | 2020/033395 A1 | 2/2020 | |
| WO | 2020/069114 A1 | 4/2020 | |
| WO | 2020/198584 A1 | 10/2020 | |
| WO | 2020/223692 A1 | 11/2020 | |
| WO | 2022/078692 A1 | 4/2022 | |

OTHER PUBLICATIONS

"3rd Generation Partnership Project; Technical Specification Group Radio Access Network; NG-RAN; F1 application protocol (F1AP) (Release 16)", 3GPP TS 38.473, V16.3.1, Oct. 2020, pp. 1-455.

"Multiple-Gigabit/s radio equipment operating in the 60 GHz band; Harmonised Standard covering the essential requirements of article 3.2 of Directive 2014/53/EU", ETSI EN 302 567, V2.1.1, Jul. 2017, pp. 1-40.

"Wideband Data Transmission Systems (WDTS) for Fixed Network Radio Equipment operating in the 57 GHz to 71 GHz band; Harmonised Standard for access to radio spectrum", ETSI EN 303 722, V1.1.0, Jul. 2021, pp. 1-40.

"Wideband Data Transmission Systems (WDTS) for Mobile and Fixed Radio Equipment operating in the 57-71 GHZ band; Harmonised Standard for access to radio spectrum", ETSI EN 303 753, V1.0.0, Jun. 2023, pp. 1-45.

"Revised WID on enhancement of data collection for SON/MDT in NR and EN-DC", 3GPP TSG RAN meeting #88-e, RP-201281, Agenda Item: 9.10.14, CMCC, Jun. 26-Jul. 3, 2020, 5 pages.

"IEEE 802.11AD", Wikipedia, Retrieved on Sep. 26, 2023, Webpage available at : https://en.wikipedia.org/wiki/IEEE 802.11ad.

"IEEE 802.11AY", Wikipedia, Retrieved on Sep. 26, 2023, Webpage available at : https://en.wikipedia.org/wiki/IEEE_802.11ay.

"Design of NR channel access mechanisms for 60 GHz unlicensed band", 3GPP TSG RAN WG1 #103-e, R1-2007927, Agenda item: 8.2.2, Nokia, Oct. 26-Nov. 13, 2020, 14 pages.

"Multi-armed bandit", Wikipedia, Retrieved on Sep. 26, 2023, Webpage available at : https://en.wikipedia.org/wiki/Multi-armed bandit.

"IEEE 802.11 ", Wikipedia, Retrieved on Sep. 26, 2023, Webpage available at : https://en.wikipedia.org/wiki/IEEE_802.11.

"3rd Generation Partnership Project; Technical Specification Group Radio Access Network; NR; NR and NG-RAN Overall Description; Stage 2 (Release 16)", 3GPP TS 38.300, V16.2.0, Jul. 2020, pp. 1-148.

Office Action received for corresponding Finnish Patent Application No. 20215393, dated Sep. 21, 2021, 8 pages.

Office Action received for corresponding Finnish Patent Application No. 20215393, dated Feb. 11, 2022, 6 pages.

International Search Report and Written Opinion received for corresponding Patent Cooperation Treaty Application No. PCT/FI2022/050134, dated Jun. 2, 2022, 14 pages.

"Revised WID: Further enhancement of data collection for SON (Self-Organising Networks)/MDT (Minimization of Drive Tests) in NR standalone and MR-DC (Multi-Radio Dual Connectivity)", 3GPP TSG RAN meeting #96, RP-221825, Agenda Item: 9.3.3.1, CMCC, Jun. 6-9, 2022, 7 pages.

Extended European Search Report received for corresponding European Patent Application No. 22779208.2, dated Jan. 20, 2025, 9 pages.

* cited by examiner

MANAGING LISTEN BEFORE TALK

TECHNOLOGICAL FIELD

Examples of the present disclosure relate to managing Listen Before Talk. Some examples, though without prejudice to the foregoing, relate to managing Listen Before Talk in a Radio Access Network.

BACKGROUND

Listen Before Talk (or Listen Before Transmit), LBT, is a channel access procedure for a radio network wherein a transmitting device, e.g., User Equipment, UE, performs a Clear Channel Assessment (CCA) to determine whether a channel is occupied or not before accessing the channel based on an amount of energy detected over the channel by the transmitting device. A transmission is initiated only if the channel is determined not to be occupied. The use of LBT can increase the reliability of transmissions but it can also increase latency and reduce network capacity due to LBT overhead.

In some circumstances it can be desirable to manage LBT use in a network to provide an optimal balance with regards to reliability and latency of transmissions as well as network capacity. In some circumstances, it can be desirable to manage LBT use in a network to optimally serve different traffic types having differing service performance requirements or different UEs in different interference situations.

The listing or discussion of any prior-published document or any background in this specification should not necessarily be taken as an acknowledgement that the document or background is part of the state of the art or is common general knowledge.

One or more aspects/examples of the present disclosure may or may not address one or more of the background issues.

BRIEF SUMMARY

The scope of protection sought for various embodiments of the invention is set out by the independent claims.

According to various, but not necessarily all, examples of the disclosure there are provided examples as claimed in the appended claims. Any embodiments/examples and features described in this specification that do not fall under the scope of the independent claims are to be interpreted as examples useful for understanding various embodiments of the invention.

According to at least some examples of the disclosure there is provided a centralized unit of an access node for use in a network comprising at least the centralized unit and a distributed unit, the centralized unit comprising means configured to:

receive information indicative of a quality of a channel; and cause an adaptation of a Listen-Before-Talk state of at least one network node based, at least in part, on the received information.

According to various, but not necessarily all, examples of the disclosure there is provided a method for use in a centralized unit of an access node, the method comprising:

receiving information indicative of a quality of a channel; and causing an adaptation of a Listen-Before-Talk state of at least one network node based, at least in part, on the received information.

According to various, but not necessarily all, examples of the disclosure there is provided computer program instructions for causing a centralized unit of an access node to perform:

receiving information indicative of a quality of a channel; and causing an adaptation of a Listen-Before-Talk state of at least one network node based, at least in part, on the received information.

According to various, but not necessarily all, examples of the disclosure there is provided a centralized unit of an access node comprising:

at least one processor; and at least one memory including computer program instructions;

the at least one memory and the computer program instructions configured to, with the at least one processor, cause the apparatus at least to perform:

receiving information indicative of a quality of a channel; and causing an adaptation of a Listen-Before-Talk state of at least one network node based, at least in part, on the received information.

According to various, but not necessarily all, examples of the disclosure there is provided a non-transitory computer readable medium encoded with instructions that, when performed by at least one processor, causes at least the following to be performed:

receiving information indicative of a quality of a channel; and causing an adaptation of a Listen-Before-Talk state of at least one network node based, at least in part, on the received information.

According to at least some examples of the disclosure there is provided a node of a network comprising means configured to:

send information indicative of a quality of a channel to a centralized unit of an access node;

receive, responsive to sending the information, control information for adaptation of a Listen-Before-Talk state of the node; and adapt the Listen-Before-Talk state of the node based at least in part on the received control information.

According to various, but not necessarily all, examples of the disclosure there is provided a method for use in a node of a network comprising:

sending information indicative of a quality of a channel to a centralized unit of an access node;

receiving, responsive to sending the information, control information for adaptation of a Listen-Before-Talk state of the node; and adapting the Listen-Before-Talk state of the node based at least in part on the received control information.

According to various, but not necessarily all, examples of the disclosure there is provided computer program instructions for causing a node of a network to perform:

sending information indicative of a quality of a channel to a centralized unit of an access node;

receiving, responsive to sending the information, control information for adaptation of a Listen-Before-Talk state of the node; and adapting the Listen-Before-Talk state of the node based at least in part on the received control information.

According to various, but not necessarily all, examples of the disclosure there is provided a node of a network comprising:

at least one processor; and at least one memory including computer program instructions;

the at least one memory and the computer program instructions configured to, with the at least one processor, cause the apparatus at least to perform:

sending information indicative of a quality of a channel to a centralized unit of an access node;

receiving, responsive to sending the information, control information for adaptation of a Listen-Before-Talk state of the node; and adapting the Listen-Before-Talk state of the node based at least in part on the received control information.

According to various, but not necessarily all, examples of the disclosure there is provided a non-transitory computer readable medium encoded with instructions that, when performed by at least one processor, causes at least the following to be performed:

sending information indicative of a quality of a channel to a centralized unit of an access node;

receiving, responsive to sending the information, control information for adaptation of a Listen-Before-Talk state of the node; and adapting the Listen-Before-Talk state of the node based at least in part on the received control information.

The following portion of this 'Brief Summary' section describes various features that can be features of any of the examples described in the foregoing portion of the 'Brief Summary' section. The description of a function should additionally be considered to also disclose any means suitable for performing that function.

In some but not necessarily all examples, the centralized unit of the access node comprises means configured to:

determine, based at least in part on the received information, a Listen-Before-Talk state; and cause transmission of configuration information for transitioning the Listen-Before-Talk state of the at least one network node to the determined Listen-Before-Talk state.

In some but not necessarily all examples, the received information comprises one or more selected from a group of:

an indication of Listen-Before-Talk performance;

an indication of one or more Listen-Before-Talk Failures;

an indication of one or more Listen-Before-Talk Failure Rates;

an indication of one or more Block Error Rates;

an indication of one or more Outer-Loop Link Adaptation offsets;

an indication of throughput; and an indication of latency.

In some but not necessarily all examples, the received information comprises a value of a parameter indicative of the quality of the channel; and the centralized unit of the access node comprises means configured to:

cause the at least one network node to transition between a first Listen-Before-Talk state and a second Listen-Before-Talk state based, at least in part, on the value of the parameter crossing a threshold value.

In some but not necessarily all examples, the Listen-Before-Talk state comprises at least one selected from a group of:

an enabled Listen-Before-Talk state;

a disabled Listen-Before-Talk state;

an omnidirectional Listen-Before-Talk state;

a quasi-omnidirectional Listen-Before-Talk state;

a directional Listen-Before-Talk state;

a receiver-assisted Listen-Before-Talk state;

an uplink Listen-Before-Talk state;

a downlink Listen-Before-Talk state; and a Listen-Before-Talk state utilising a threshold parameter value.

In some but not necessarily all examples, causing an adaptation of the Listen-Before-Talk state comprises at least one selected from a group of:

enabling the Listen-Before-Talk state;

disabling the Listen-Before-Talk state;

switching between Listen-Before-Talk states;

adjusting one or more parameters of the Listen-Before-Talk state;

adjusting a Listen-Before-Talk threshold parameter value; and signaling, to the at least one network node, which Listen-Before-Talk states the at least one network node can use.

In some but not necessarily all examples, the centralized unit of the access node comprises means configured to:

receive additional information, the additional information comprising at least one selected from a group of: beam information, cell information, UE information, and traffic information beam information; and cause an adaptation of the Listen-Before-Talk state based, at least in part, on the received additional information.

In some but not necessarily all examples, the centralized unit of the access node comprises means configured to cause at least one selected from a group of: beam-specific, cell-specific, UE-specific, and traffic-specific adaptation of the Listen-Before-Talk state.

In some but not necessarily all examples, the received information comprises: first information indicative of the quality of the channel from a first network node, and second information indicative of the quality of the channel from a second network node; and causing the adaptation of the Listen-Before-Talk state is based, at least in part, on the first information and the second information.

In some but not necessarily all examples, the received information is from a first network node; and causing the adaptation of the Listen-Before-Talk state comprises causing the adaptation of the Listen-Before-Talk state of a second network node.

In some but not necessarily all examples, the centralized unit of the access node comprises means configured to: cause transmission of configuration information, to the at least one network node, for adapting a Listen-Before-Talk threshold parameter value used by the at least one network node for assessing whether a channel is clear.

In some but not necessarily all examples, the at least one network node comprises at least one selected from a group of:

one or more distributed units of the access node; and one or more user equipment.

In some but not necessarily all examples, there is provided a system comprising:

the centralized unit of the access node as mentioned above; and one or more nodes as mentioned above.

While the above examples of the disclosure and optional features are described separately, it is to be understood that their provision in all possible combinations and permutations is contained within the disclosure. Also, it is to be understood that various examples of the disclosure can comprise any or all of the features described in respect of other examples of the disclosure, and vice versa.

BRIEF DESCRIPTION OF THE DRAWINGS

Some examples will now be described with reference to the accompanying drawings in which.

Figures 1, 2, 3:
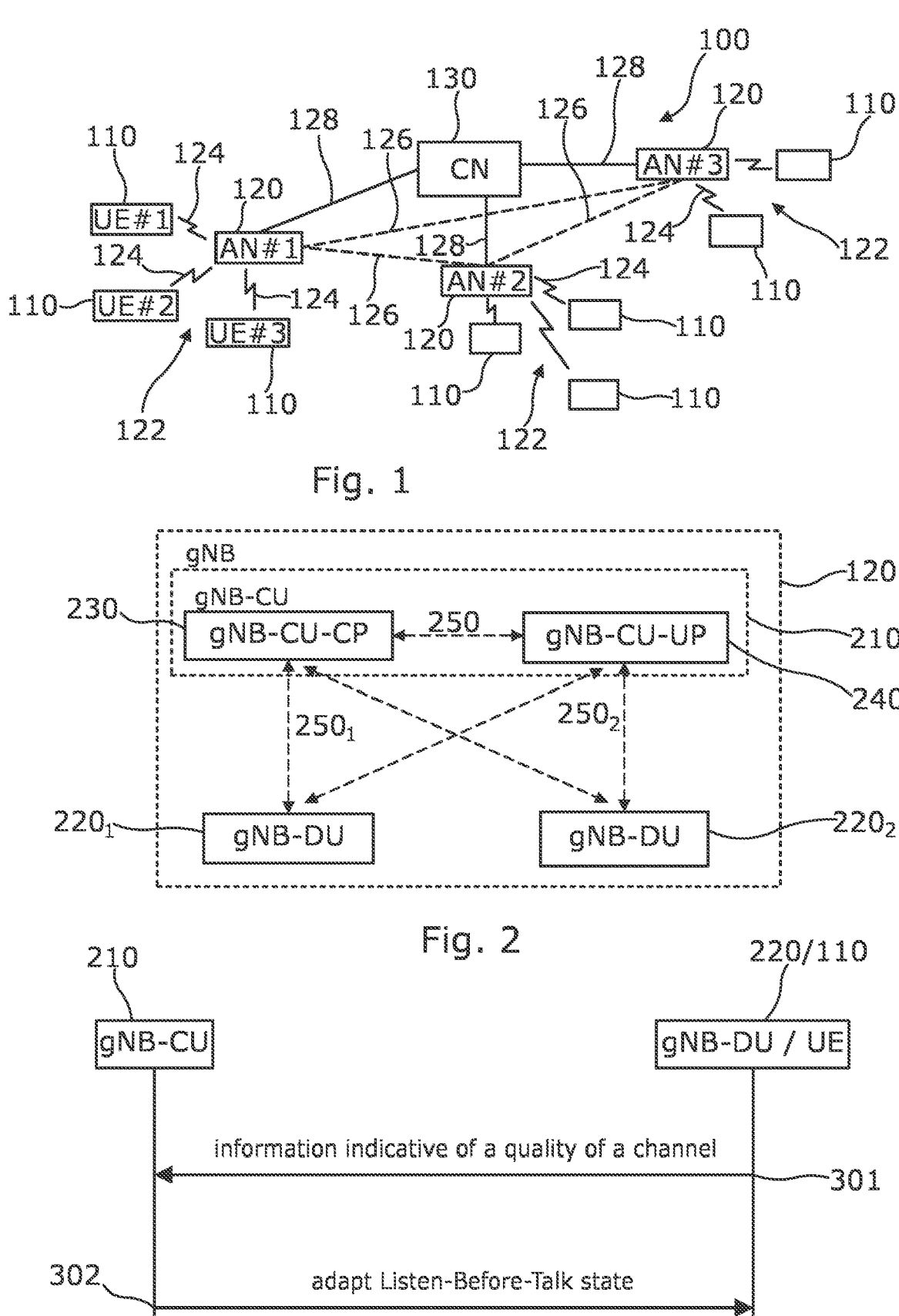
FIG. 1 shows an example of the subject matter described herein.
FIG. 2 shows another example of the subject matter described herein.
FIG. 3 shows another example of the subject matter described herein.

The figures are not necessarily to scale. Certain features and views of the figures can be shown schematically or exaggerated in scale in the interest of clarity and concise-ness. For example, the dimensions of some elements in the figures can be exaggerated relative to other elements to aid explication. Similar reference numerals are used in the figures to designate similar features. For clarity, all reference numerals are not necessarily displayed in all figures.

In the drawings (and description) a similar feature may be referenced by the same three-digit number. In the drawings (and description), an optional subscript to the three-digit number can be used to differentiate different instances of similar features. Therefore, a three-digit number without a subscript can be used as a generic reference and the three-digit number with a subscript can be used as a specific reference. A subscript can comprise a single digit that labels different instances. A subscript can comprise two digits including a first digit that labels a group of instances and a second digit that labels different instances in the group.

ABBREVIATIONS/DEFINITIONS

BLER Block Error Rate
CCA Clear Channel Assessment
CSI-RS Channel State Information Reference Signal
eMBB enhanced Mobile Broadband
gNB gNodeB
IIOT Industrial Internet of Things
LAA Licensed-Assisted Access
LBT Listen Before Talk
LFR LBT Failure Rate
MIOT Manufacturing Internet of Things
OLLA Outer-Loop Link Adaptation
RRC Radio Resource Control
RSRP Reference Signal Received Power
SD Slice Differentiator
SON Self Organizing Networks SSB Synchronisation Signal Block
SST Slice/Service Type
UE User Equipment
URLLC Ultra-Reliable Low Latency Communication

DETAILED DESCRIPTION

FIG. 1 schematically illustrates an example of a network 100 comprising a plurality of network nodes including terminal nodes 110 (also referred to as User Equipment, UE), access nodes 120 and one or more core nodes 130. The terminal nodes 110 and access nodes 120 communicate with each other. The access nodes 120 communicate with the one or more core nodes 130. The one or more core nodes 130 may, in some but not necessarily all examples, communicate with each other. The one or more access nodes 120 may, in some but not necessarily all examples, communicate with each other.

The network 100 is in this example a radio telecommu-nications network, i.e., a Radio Access Network, RAN, in which at least some of the terminal nodes 110 and access nodes 120 communicate with each other using transmission/reception of radio waves.

The RAN 100 may be a cellular network comprising a plurality of cells 122 each served by an access node 120. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for 5G technology.

The interfaces between the terminal nodes 110 and the access nodes 120 are radio interfaces 124 (e.g., Uu inter-faces). The interfaces between the access nodes 120 and one or more core nodes 130 are backhaul interfaces 128 (e.g., S1 and/or NG interfaces).

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility Man-agement Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands, not least such as a 60 GHz unlicensed band where beamforming is mandatory in order to achieve required coverage.

The access nodes 120 can be deployed in a NR standalone operation/scenario. The access nodes 120 can be deployed in a NR non-standalone operation/scenario. The access nodes can be deployed in a Carrier Aggregation operation/sce-nario. The access nodes 120 can be deployed in a dual connectivity operation/scenario, i.e., Multi Radio Access Technology-Dual Connection (MR-DC), not least for example such as:

Evolved Universal Terrestrial Radio Access-New Radio Dual Connectivity (EUTRA-NR-DC, also referred to as EN-DC), New Radio-Evolved Universal Terrestrial Radio Access Dual Connectivity (NR-EUTRA-DC, also referred to as NE-DC), Next Generation Radio Access Network Evolved Universal Terrestrial Radio Access-New Radio Dual Connectivity (NG-RAN E-UTRA-NR Dual Connectivity, also referred to as NGEN-DC), or New Radio Dual Connectivity (also referred to as NR-DC).

In such non-standalone/dual connectivity deployments, the access nodes 120 may be interconnected to each other by means of X2 or Xn interfaces and connected to an Evolved Packet Core (EPC) by means of an S1 interface or to the 5GC by means of a NG interface.

The terminal nodes 110 are network elements in the network that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc such as a subscriber identity module (SIM). In other examples, the term 'User Equipment' is used to designate mobile equipment comprising circuitry embedded as part of the user equipment for authentication/encryption such as software SIM.

The access nodes 120 are network elements in the network responsible for radio transmission and reception in one or more cells 122 to or from the terminal nodes 110. Such access nodes may also be referred to as a transmission reception points (TRP's) or base stations. The access nodes 120 are the network termination of a radio link. An access node 120 can be implemented as a single network equipment, or disaggregated/distributed over two or more RAN nodes, such as a central unit (CU), a distributed unit (DU), a remote radio head-end (RRH), using different functional-split architectures and different interfaces.

FIG. 2 illustrates an example of an access node 120 (e.g., gNB). In this example, the access node has a disaggregated (split) architecture. The gNB 120 comprises one or more distributed units (gNB-DU) 220 and a centralized unit (gNB-CU) 210.

The gNB-CU 210 is a logical node configured to host a Radio Resource Connection layer (RRC) and other layers of the gNB 120. The gNB-CU 210 controls the operation of one or more gNB-DUs 220. The gNB-DU 220 is a logical node configured to host Radio Link Control protocol layer (RLC), Medium Access Control layer (MAC) and Physical layer (PHY) of the access node (gNB) 120. The gNB-DU 220 communicates via a dedicated interface 250 (F1) to the RRC layer hosted by the gNB-CU.

One gNB-DU 220 can support one or multiple cells 122 (not illustrated in the figure). One cell is supported by only one gNB-DU 20.

The gNB-CU 210 and a gNB-DU 220 communicate via a dedicated interface 250, the F1 interface. The F1 interface 250 connects a Radio Resource Connection layer (RRC) hosted by the gNB-CU 210 to the different, lower layers hosted by the gNB-DU 220. The F1 interface functions are divided into F1-Control Plane Function (F1-C) $250_1$ and F1-User Plane Function (F1-U) $250_2$.

In the following description, a centralized unit of an access node will be referred to as gNB-CU 210, distributed units referred to as gNB-DU 220 and a terminal node 110 will be referred to as a UE 110. Moreover, in the context of the following description, references to at least one network node refers to a distributed unit gNB-DU 220 and/or a UE 110.

A gNB-DU 220 and a UE 110 can operate in unlicensed access (i.e., in higher frequency bands, such above 52 GHz) and, when doing so may use Listen Before Talk (LBT) for channel access. The gNB-DU and UE 110 can use beam formed access/beamforming for their transmission and reception of signals.

LBT, is a channel access procedure for a radio network wherein a transmitting device (e.g., gNB-DU or UE) performs a Clear Channel Assessment (CCA) to determine whether a channel is occupied or not before accessing the channel. A transmission is only initiated if the channel is determined not to be occupied based on an amount of energy detected over the channel by the transmitting device. LBT is a form of channel access that may be used by License-Assisted Access (LAA).

Each of the gNB-DU 220 and the UE 110 perform measurements to sense the medium prior to effecting channel access. If the medium is found to be occupied/busy, a transmission is not allowed. Such an instance of a denial of a transmission in view of LBT measurements is defined as an occurrence of an "LBT Failure".

The gNB-DU 220 and the UE 110 may each calculate an LBT Failure Rate, LFR, based on the times each is prevented to access the channel.

A UE 110 may be configured with a Minimization of Driving Test, MDT, configuration, for reporting LFR to the network/gNB-DU/gNB-CU. The LFR is calculated by the UE 110 based on the number of LBT Failures divided by overall number of access attempts. An MDT configuration may additionally indicate entering and exiting conditions that must be satisfied at the UE in order to perform the LBT reporting.

The possible entering/triggering conditions for the UE to log LBT failures and report LFR may include one or more of the following:

1. Event-based: Event-based conditions to start calculating and reporting LFR can be:

(a) occurrence of a first LBT Failure at the UE. This triggers calculation of the LFR in which case the UE continues calculating and reporting LFR every time a new LBT occurs or periodically;

(b) occurrence of a number of consecutive LBT Failures exceeding a network configured threshold, in which case the UE starts calculating and reporting its LFR (e.g., after 3 LBT Failures happened consecutively). The threshold may be given to the UE along with the MDT configuration. The network can select the threshold so that it is more "re-active" to LBT failures (i.e., a low/small value of the threshold is configured at the UE), or "less reactive" (i.e., a higher value of the threshold is configured). The UE continues calculating and reporting its LFR every time an LBT failure happens exceeding the threshold, or the UE may report LFR periodically;

(c) occurrence of a number of consecutive LBT successes exceeding a (network configured threshold) in which case the UE starts calculating and reporting its LFR (e.g., after 20 LBT successes happened consecutively). The threshold may be given to the UE along with the MDT configuration. The network can select the threshold so that it is more "re-active" to LBT successes (i.e., a low/small value of the threshold is configured at the UE) or "less reactive" (i.e., a higher value of the threshold is configured). The UE continues calculating and reporting its LFR every time an LBT success happens exceeding the threshold, or the UE may report its LFR periodically; and/or (d) the LFR exceeding a certain value/threshold. The threshold can be used both ways, i.e., to indicate LFR higher than threshold or lower than threshold.

2. Time-based: The UE's LFR is calculated and reported for a predetermined period of time from when the UE receives the MDT Configuration. Alternatively, the UE may start reporting LFR after a certain point in time. The UE may continue reporting its LFR periodically. The UE may alternatively continue reporting LFR while its value stays above or below a threshold.

3. Combination of Event-based and Time-based triggers can be used, i.e., LBT logging and reporting occurs when both time-based and event-based conditions are satisfied. For example, the UE is triggered to calculate the LFR after a certain time instant and when the LFR exceeds a certain value.

Possible exiting conditions for UE to stop logging LFR are:

1. Time-based: After a certain time has elapsed, and/or

2. Event-based: When LFR has dropped below/increased above the threshold.

An LFR is likewise calculated by the gNB-DU 220 based on the number of LBT Failures/overall number of access attempts.

FIG. 3 schematically illustrates nodes of a network, namely a first network node (namely, a centralized unit, gNB-CU 210, of a disaggregated access node) and a second network node (namely a distributed unit, gNB-DU 220, of the disaggregated access node and/or a UE 110).

The gNB-DU 220 and/or the UE 110 sends information 301 indicative of a quality of a channel to the gNB-CU 120. Based at least in part on the received information, the gNB-CU 120 causes an adaptation 302 of a Listen-Before-Talk state of the gNB-DU 220 and/or UE 110 based at least in part on the received information.

In the example shown, the LBT state that is caused to be adapted is an LBT state of the second network node (i.e., either the gNB-DU 220 and/or UE 110) that sent the information indicative of the quality of the channel. However, in other examples, the network node whose LBT state is to be adapted differs from the network node that sent the information, i.e., the LBT state of a third network node may be caused to be adapted. For instance, the information may be sent from a first UE, whereupon such information is used by the gNB-CU 210 to cause adaptation of the LBT state of a second UE. Similarly, for instance, the information may be sent from a first UE, whereupon such information is used by the gNB-CU 210 to cause adaptation of the LBT state of a gNB-DU 220, i.e., the gNB-DU 220 serving the UE, for example so as to require receiver assisted LBT. Receiver assisted LBT may involve a similar handshaking method to Request To Send/Clear To Send, RTS/CTS, in Wireless Local Area Network, WLAN. Other methods for receiver assisted LBT may involve using e.g., Received Signal Strength Indicator, RSSI, or Channel State Information, CSI, to report an interference condition.

In at least some examples, the information indicative of the quality of the channel relates to measurements on the channel performed by the network node (i.e., either the gNB-DU 220 and/or UE 110) that sent the information.

In at least some examples, the received information indicative of the quality of the channel enables the gNB 210 to determine and/or quantify one or more quality characteristics of the channel, such characteristics may relate to: interference, congestion, load, and/or reliability.

In at least some examples, the received information comprises at least one of the following:

an indication of Listen-Before-Talk performance on the channel;

an indication of one or more Listen-Before-Talk Failures on the channel;

an indication of one or more Listen-Before-Talk Failure Rates on the channel;

an indication of one or more Block Error Rates of data transmitted over the channel;

an indication of one or more Outer-Loop Link Adaptation offsets for the channel;

an indication of throughput (e.g., data throughput over the channel—such an indication can be used as a 'reward' with regards to the use of Machine Learning in determining LBT adjustments as discussed below); and/or an indication of latency (e.g., latency experienced over the channel—such an indication can be used as a 'reward' with regards to the use of Machine Learning in determining LBT adjustments as discussed below).

Such information may be determined/measured by the gNB-DU 220 and/or UE 110.

In some examples, the gNB-CU enables or disables the reporting of LFR. The gNB-CU can configure a UE with a threshold of LFR above which the UE should perform LFR reporting. A similar threshold can be configured at the gNB-DU. These thresholds for both UE and gNB-DU could be given in an Unlicensed configuration given by the gNB-CU.

In some examples, the gNB-CU 210 causes the adaptation of the LBT for the network node by:

determining/selecting an LBT state for a network node (e.g., the gNB-DU 220 and/or UE 110) based at least in part on the received information; and generating LBT configuration information and/or control information for adjusting or triggering a transition of the network node's LBT state; and causing the transmission of information to the network node for changing the Listen-Before-Talk state of the network node. The information sent may be configuration information for enabling the network node to change its LBT state, or control information for triggering the network node to change its LBT state.

In some examples, the adaptation of the LBT state of the network node is an adjustment of the network node's current LBT: mode, type, scheme, operation, configuration and/or parameter. In some examples, the adaptation of the LBT state of the network node is transitioning the LBT state between a first LBT state and a second LBT state.

In some examples, the Listen-Before-Talk state to be adapted, or transitioned to/from, comprises at least one selected from a group of:

an enabled Listen-Before-Talk state;

a disabled Listen-Before-Talk state;

an omnidirectional Listen-Before-Talk state;

a quasi-omnidirectional Listen-Before-Talk state, or substantially omnidirectional Listen-Before-Talk state (in this regard, it is noted that actual omnidirectionality may not be possible when operating at high frequencies, e.g., in the 60 GHz range, due to the use of directional antenna panels rather than omnidirectional antennas. In this context, 'quasi-omnidirectional' relates to the use/configuration of a directional panel so that it is made as close to omnidirectional as possible, e.g., via appropriate beam forming techniques);

a directional Listen-Before-Talk state;

a receiver-assisted Listen-Before-Talk state;

an uplink Listen-Before-Talk state;

a downlink Listen-Before-Talk state; and a Listen-Before-Talk state utilising a threshold parameter value.

In some examples, causing an adaptation of the Listen-Before-Talk state of the network node comprises causing/triggering, in the network node, at least one selected from a group of:

enabling a Listen-Before-Talk state;

disabling a Listen-Before-Talk state;

switching between Listen-Before-Talk states;

adjusting one or more parameters of a Listen-Before-Talk state;

adjusting a Listen-Before-Talk threshold parameter value; and signaling, to the at least one network node, which Listen-Before-Talk states the at least one network node can use; (For example, rather than the gNB-CU instructing the gNB-DU or UE to use a particular LBT state, the gNB-CU could signal to the gNB-DU or UE which LBT states the gNB-DU or UE can use. For instance, the gNB-CU can instruct the gNB-DU (or UE) that it may use different LBT states with certain probabilities/rates, e.g.: in a scenario, in which the gNB-CU considers no-LBT to be the most suitable LBT state, the gNB-DU (or UE) is instructed to use no-LBT in 90% of the cases and directional LBT in 10% of the cases. This would effectively enable the use of directional LBT to be tested to see if it turns out to be better than no-LBT—this can be useful with regards to the use of Machine Learning in determining LBT adjustments as discussed below).

In some examples, the received information comprises a value of a parameter that is indicative of the quality of the channel (e.g., LBT Failure Rate, LFR; Block Error Rate, BLER; or Outer-Loop Link Adaptation, OLLA, offset). The gNB-CU determines whether or not to cause an adaptation of the LBT state (and what the adaptation should be) based at least in part on a determination that the parameter value crosses a threshold value.

In some examples, the gNB-CU further receives additional information, from the network node, such additional information comprising at least one selected from a group of:

beam information (e.g., an identifier of the beam associated with the channel that the channel quality information relates to, such as Channel State Information Reference Signal, CSI-RS, or Synchronisation Signal Block, SSB, indexes);

cell information (e.g., an identifier of the cell associated with the channel that the channel quality information relates to);

UE information (an identifier of the UE associated with the channel that the channel quality information relates to); and traffic information (an indication as to type or priority level/class of traffic that is to be transmitted over the channel, such as related to the data's required: quality of service, latency and/or reliability).

In some examples, the gNB-CU causes the adaptation of the LBT based, at least in part, on the received additional information. For example, using the received additional information, the adaptation of an LBT state could be: beam-specific, cell-specific, UE-specific and/or traffic-specific.

For instance:

LBT states for all UE's using one or more specific beams of a gNB-DU could be caused to be adapted;

LBT states for one or more specific cell/gNB-DUs could be caused to be adapted;

LBT states for all UE's using a particular cell/gNB-DU could be caused to be adapted;

LBT states for one or more specific UEs could be caused to be adapted; and/or

LBT states for a gNB-DU and/or UE for traffic between the gNB-DU and UE that has a Quality of Service, QoS, parameter value above a threshold level could be caused to be adapted. In addition or alternatively, other parameters can be used in this regard, not least such as a network slicing parameter, for example a Slice/Service Type, SST, parameter (wherein the SST can indicate whether the traffic is e.g.: Ultra-Reliable Low Latency Communication, URLLC; enhanced Mobile Broadband, eMBB; Manufacturing Internet of Things, MIOT) or a Slice Differentiator, SD.

As will be explained in further detail below, one or more LFRs are reported (by either a gNB-DU 220 and/or a UE 110, which may be operating in higher frequencies, e.g., 60 GHz spectrum, unlicensed access) to a gNB-CU 210. The gNB-CU uses the received LFR(s) to determine an adjustment to be made to an LBT state (and/or an adjustment to an LBT parameter) of the gNB-DU 220 and/or the UE 110. The gNB-CU then causes the adjustment of the LBT state (or LBT parameter) of the gNB-DU 220 and/or the UE, thereby effecting an adjustment of either a Downlink, DL, LBT state/mode of operation and/or effecting an adjustment of an Uplink, UL, LBT state/mode of operation.

Where the gNB-DU and UE use beam formed access, such as for transmissions in an unlicensed frequency range (not least such as over 52 GHz), the use of beams in beamforming may reduce the probability of interference significantly among unlicensed transmissions. In cases where narrow beams are used, or in cases where the network is lightly loaded, there may not be a need to use LBT and hence LBT could be disabled by the network on some or all the gNB-DUs/UEs. Light loading can be recognized by a low LFR. Disabling LBT reduces latency experienced since there is no need to wait for the LBT procedure to finish. On the other hand, in Ultra-Reliable Low Latency Communication, URLLC, the occurrence of a collision, even if that happens very seldomly, may have to be avoided to achieve a targeted high reliability. Hence the use of LBT may be desirable in some cases. When LBT is not used, there are not LBT measurements being made, LBT failures being logged nor and LFR information available. Accordingly, in such situation, rather than using LFR to determine an LBT state adjustment for a gNB-DU and/or UE, instead an alternative indicator of a quality of a channel is used, e.g., a BLER estimate based on ACK/NACKs. This could be used to enable/return to a LBT state/mode of operation. For instance, when a BLER value gets too high (i.e., above a threshold), this could be indicative of some interference issue and hence that the use of LBT is desirable. Also, in gNB transmissions, OLLA offset could also be used as an indicator of a quality of a channel and as a criterion for determining whether to enable an LBT state, i.e., very high OLLA offset (above a threshold value) could again be a sign of interference and that the use of LBT is desirable.

In some examples, a gNB-CU may use LFR information, together with beam information and UE traffic type received from a gNB-DU, to adjust the gNB-DU LBT state, e.g., to transition from one LBT state (e.g., omnidirectional LBT, quasi-omnidirectional LBT, directional LBT or receiver assisted LBT) to another. Directional LBT is not always optimal, e.g., because receiver beamforming also affects what kind of interference the receiver experiences. Omni-directional/quasi-omnidirectional LBT tend to be over-protective, but it may be used in instances where directional LBT in inadequate/does not work sufficiently. Also, receiver assisted LBT may be used for the same reason.

In some examples, UE LFR information could be used as a trigger for using receiver assisted LBT. For example, high UE LFR (e.g., above a threshold value) while having low gNB-DU LFR may mean that the UE is subject to significant interference that the gNB-DU is not aware of (e.g., due to differences in beamforming), and hence receiver assisted LBT could be useful.

In some examples, the gNB-CU may use the LFR information received from a UE (and optionally additional information received from the UE, not least such as: UE traffic type, cell ID and Beam ID) to adjust the UE's LBT method, i.e., the UL LBT mode, such as switching between omni-directional/quasi-omnidirectional LBT and directional LBT. Directional LBT is not always optimal, e.g., because receiver beamforming also affects what kind of interference the receiver experiences. Omnidirectional/quasi-omnidirectional LBT tends to be over-protective but may be used in case directional LBT is inadequate and does not work sufficiently well. Also, receiver-assisted LBT may be used for the same reason.

In some examples, the gNB-CU may use the LFR information received from a gNB-DU/UE to adjust an LBT parameter such as an LBT threshold, e.g., an energy level threshold used in the CCA of an LBT procedure. Typically, regulations stipulate a maximum value of such a threshold. However, in order to reduce collisions and hence improve the reliability, a lower threshold value can be used. For instance, in coordinated deployments, e.g., factories using unlicensed band network for URLLC type traffic, lowering the threshold for all or part of the network nodes (i.e., particular gNB-DUs/UEs) may be useful. Network nodes could be grouped based, e.g., on different traffic requirements to groups having different threshold values. For example, network nodes requiring lower latency could have a higher threshold, whereas the rest of the nodes could have a lower threshold value.

The methods described above could also be applied at a per-beam or per-UE level, based on the fact that for UEs in areas where interference from neighbouring cells is likely to occur, the use of LBT (and in particular receiver-assisted LBT), is likely to be expedient, while for UEs in a cell centre operation without LBT is likely to be feasible and a good choice, as it avoids the LBT overhead.

In some examples, a gNB (gNB-CU) signals an updated decision on LBT operation to a UE (e.g., via RRC signaling) and to the gNB-DU (e.g., via F1 signaling). Furthermore, the gNB-CU may update an LBT threshold and signal it to the UE and the gNB-DU. Changing of the LBT threshold of a UE affects the latency experienced by it to access the channel (but also affects the interference with which the transmission will take place). In coordinated deployments for e.g., URLLC/Industrial Internet of Things, IIOT, purpose, the network/gNB-CU could lower the LBT threshold for all or part of the network nodes (i.e., gNB-DUs/UEs), depending e.g., on traffic type (such as Slice/Service Type), in order to reduce the latency. Lowering threshold reduces the network capacity, but this could be done to reach desired compromise between capacity and latency/reliability in e.g., in a factory deployment environment. An upper limit to the threshold may be set by regulations if LBT were mandatory in the frequency band used. However, as discussed above, it may be advantageous to adjust the threshold value within any upper limit stipulated by regulations.

Examples of the disclosure may help optimize latency/reliability and capacity of a network as well as serve different traffic types/needs optimally. Examples of the disclosure may also help a network monitor unlicensed operation in terms of LBT failures.

Figure 4:
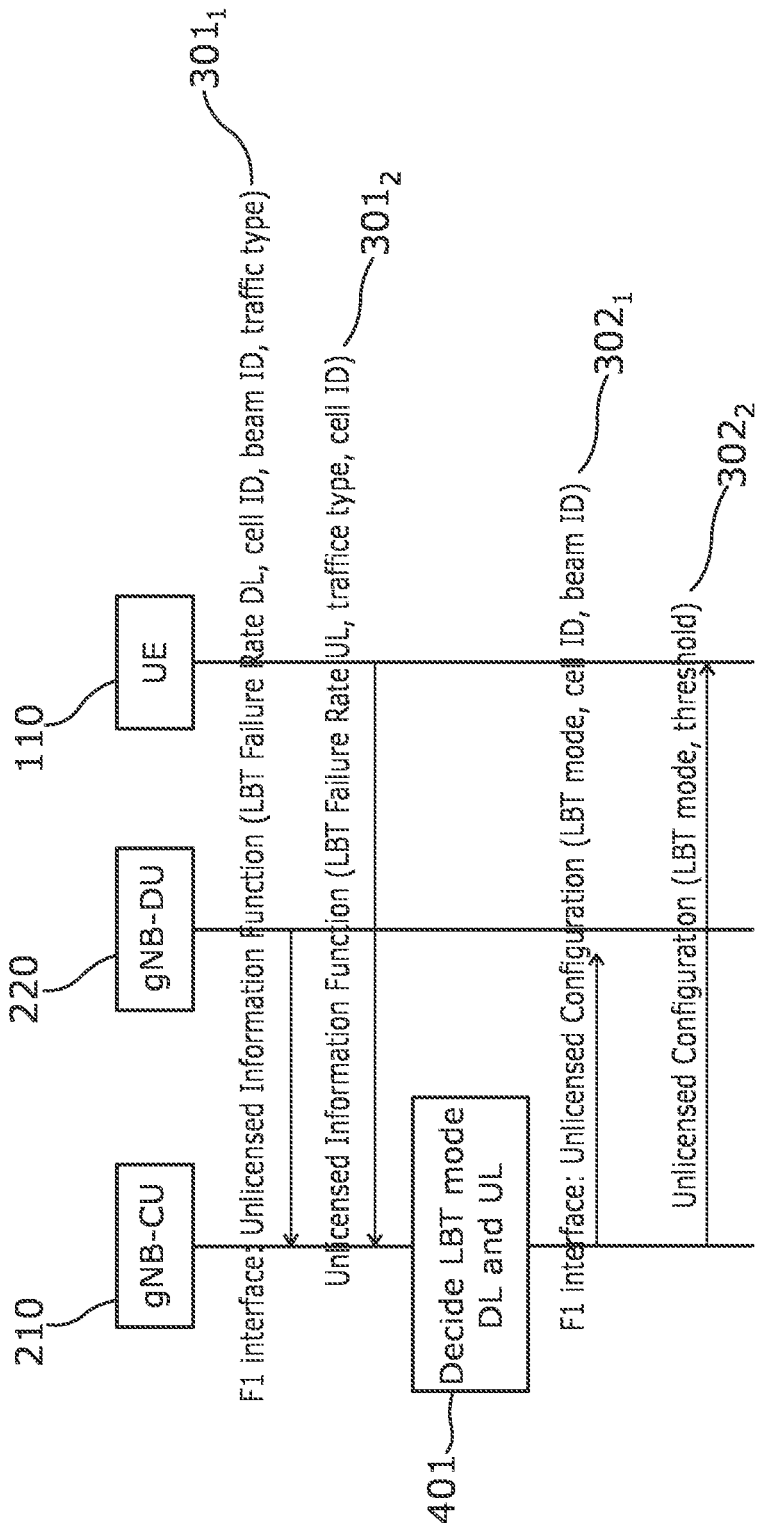
FIG. 4 shows another example of the subject matter described herein.

FIG. 4 is an example of signaling between a gNB-CU 210, a gNB-DU 220 and a UE 110 according to an example of the present disclosure.

The gNB-DU sends a message $301_1$, referred to as an "Unlicensed Information Function" message, to the gNB-CU over an F1 interface.

The LFR from the gNB-DU to the gNB-CU could be sent in a New F1AP message (e.g., Unlicensed Information Function). Alternatively, existing F1AP messages could be reused, for example a GNB-DU STATUS INDICATION message from the gNB-DU to the gNB-CU (which indicates whether the gNB-DU is overloaded and instructs the gNB-CU to take corrective actions). As another alternative, the LFR could be sent in a DU-CU RADIO INFORMATION TRANSFER (where the gNB-DU transfers radio related information to the gNB-CU).

The message may comprise fields and/or Information Elements, IE, that indicate one or more of:

LFR information, i.e., DL-LFR, namely an LFR as measured and determined by the gNB-DU;

Cell information (i.e., Cell ID); and

Beam information (i.e., Beam ID, such beam information may relate to: information regarding the beam of the gNB-DU which was used for the LBT measurements, the width of the gNB-DU's beam, CSI-RS and SSB indexes); Traffic information (i.e., traffic type, such traffic type may relate to a priority level, latency, reliability requirements for the data, such as QOS requirements. The traffic of different UEs can affect the proportion of time that the gNB 120 can use for its own transmissions as opposed to transmissions from the UEs).

In some examples, the gNB-DU reports its LFR per beam (i.e., based on CSI-RS/SSB index) to the gNB-CU.

Similarly, the UE sends a message $301_2$, also referred to as an "Unlicensed Information Function" message, to the gNB-CU, via a gNB-DU, over a Uu interface.

The LFR from the UE to the gNB-CU could be sent in a New message (e.g., Unlicensed Information Function). Alternatively, existing messages could be reused. For example, the LFR from the UE could be sent through RRC procedures (e.g., through Immediate MDT measurements) over the Uu interface.

The message $301_2$ may comprise fields and Information Elements for indicating one or more of:

LFR information, i.e., UL-LFR, namely an LFR as measured and determined by the UE;

Cell information (i.e., Cell ID); and

Traffic information (i.e., traffic type).

Optionally, beam information reporting from UE, i.e., regarding the gNB-DU DL beam can also be signaled/transmitted to gNB-CU. For example, the message $301_2$ may comprise a field and/or Information Elements for indicating a beam ID of the gNB DL beam corresponding to the UE's reception beam (assuming beam correspondence).

In some examples, rather than using a new message "Unlicensed Information Function" (as well as using a new procedure for requesting/triggering the sending of the same)

for the gNB-DU and UE to report their respective LFR and additional information to the gNB-CU, instead, pre-existing messages could be used to signal the LFR and/or additional information to the gNB-CU. For instance, the gNB-DU could indicate to the gNB-CU, via a gNB-DU "STATUS INDICATION" message of a gNB-DU status indication function, that it has a high LFR and (optionally) the mode for which this high LBT failure rate is observed. In this regard, a new field in a gNB-DU STATUS INDICATION message may be provided, e.g., "LBT Failure Rate Information", for providing LFR information. The new field could be ENU-MERATED (omni LBT, quasi-omni LBT, directional LBT, receiver assisted LBT, no LBT (i.e., channel access via method that does not use LBT), and/or receiver assisted LBT) to indicate the LBT scheme that exceeds a preconfig-ured threshold or that meets a pre-determined high LFR. If multiple such LBT schemes could exceed the threshold, then a bitstring could be used instead of the ENUMERATED structure, where each bit corresponds to one of the modes (omni LBT, quasi-omni LBT directional LBT, receiver assisted LBT, no LBT, and/or receiver assisted LBT) and the value that the bit takes indicates whether the LBT Failure rate is high or low (i.e., above or below a threshold). In some examples, the gNB-CU could request the LFR information from the gNB-DU which then is reported in the Unlicensed Information Function.

In block 401, responsive to receipt of the LFR information and additional information (e.g., cell ID, beam ID and traffic type) the gNB-CU decides which LBT mode/state the gNB-DU and UE should adopt.

The gNB-CU then generates and signals configuration information for triggering an LBT state transition (e.g., not least for example between omnidirectional LBT and direc-tional LBT) or an adjustment of an LBT parameter (e.g., not least an adjustment of an LBT operational parameter such as relating to the energy level threshold for determining CCA). The configuration information for effecting the determined LBT state adjustment/transition for the gNB-DU is sent to the gNB-DU in a "Unlicensed Configuration" message 302₁ via the F1 interface. The configuration information includes information indicative of a cell ID and beam ID to enable cell and/or beam specific LBT adjustment.

The configuration information for effecting the deter-mined LBT state adjustment/transition for the UE is sent to the UE as a "Unlicensed Configuration" message 302₂ over the Uu interface, e.g., via RRC singling. In this example, the configuration information includes information indicative of an LBT threshold for enabling an adjustment of the LBT threshold used by the UE in its LBT procedure and CCA.

If the gNB-CU determines that the UE should enable receiver-assisted LBT, in some examples, this could be indicated with a Downlink Control Information, DCI, bit from the gNB-DU to the UE. This could be advantageous for a Machine Learning approach (discussed further below) for determining/deciding an optimal LBT state since it would be required for very dynamic exploration and exploitation of receiver-assisted LBT, rather than doing this in larger chunks based on higher-layer configuration to use versus not to use receiver-assisted LBT.

In some examples, the reporting of LFR can be enabled or disabled by the gNB-CU. In some examples, the gNB-CU configures the gNB-DU with a threshold LFR above which the gNB-DU is to start reporting its LFR. In some examples, the gNB-CU configures the UE with a threshold LFR above which the UE is to start reporting its LFR. In some examples, the above-mentioned LFR thresholds for commencing UE and gNB-DU reporting could be given in the "Unlicensed Configuration" message sent by the gNB-CU to the gNB-DU and the UE.

In some examples, the gNB-CU selects an LBT state from: omnidirectional, quasi-omnidirectional directional, no LBT and whether receiver-assisted LBT should be used for transmissions from the gNB-DU to the UE. In some examples, the gNB-CU either triggers or configures the gNB-DU to transition to the selected LBT state. In some examples, the deciding/selecting of an LBT state is based on comparing LFRs to threshold values (i.e., wherein differing threshold values are associated with differing LBT states). In some examples, machine learning is used to decide/select an LBT state. In some examples, the gNB-CU configures the gNB-DU with a selected type of LBT. In some examples, the gNB-CU signals the updated decision of LBT operation, i.e., the newly selected LBT state for the gNB-DU, to the gNB-DU (e.g., via F1 signaling).

In some examples, the gNB-CU updates an LBT param-eter for the gNB-DU and signals the same to the gNB-DU. Such an LBT parameter may be a threshold value that relates to the threshold energy level used by the gNB-DU for a CCA of its LBT procedure.

In some examples, a UE reports its LFR to the gNB-CU. The gNB-CU uses the LFR information from the UE to decide the type of LBT the UE should use (e.g., omnidirec-tional, quasi-omnidirectional, directional, no LBT and/or whether receiver-assisted LBT should be used for gNB-DU transmissions). In some examples, the gNB-CU signals the updated decision on LBT operation, i.e., the newly selected LBT state for the UE, to the UE (e.g., via RRC signaling).

In some examples, the gNB-CU may update an LBT parameter for the UE and signal the same to the UE. Such an LBT parameter may be a threshold value that relates to the threshold energy level used by the UE for a CCA of its LBT procedure.

Whilst the example of FIG. 4 shows only a single gNB-CU, a single gNB-DU and a single UE, it is to be appreciated that in other examples there may be one or more: gNB-CUs, gNB-DUs and UEs that effect equivalent signaling to that shown in FIG. 4. For example, a gNB-CU may have plural gNB-DUs, wherein each gNB-DU serves a plurality of UEs. The gNB-CU may adjust the LBT state of one or more of the gNB-DUs and one or more of the UEs based upon received LFRs.

Figure 5:
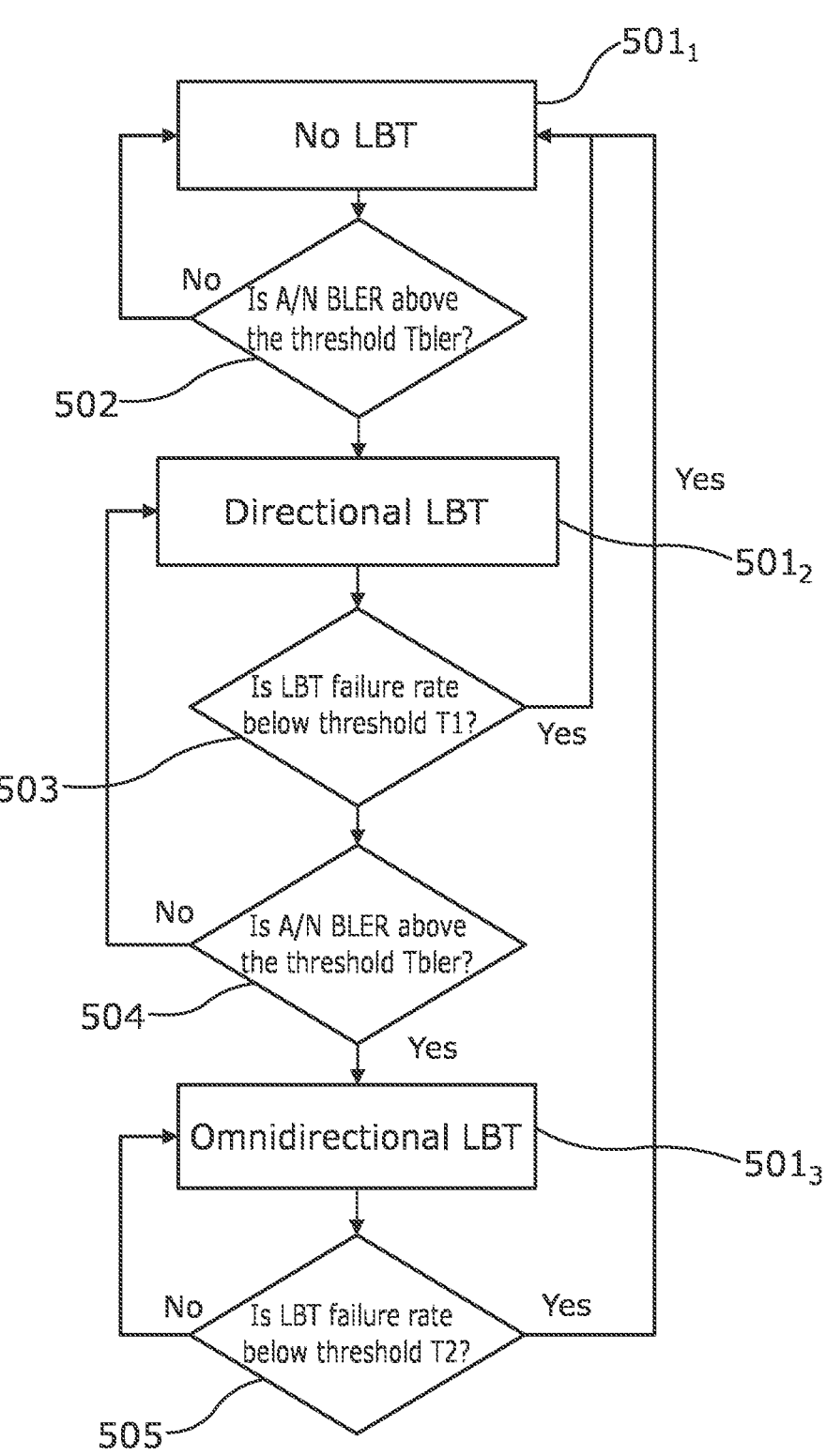
FIG. 5 shows another example of the subject matter described herein.

FIG. 5 illustrates a decision flow using LFR, namely how a first network node (i.e., gNB-CU) decides what LBT adjustment to effect for a second network node (i.e., either a gNB-DU or a UE) based on received LFR.

As will be appreciated, this figure is merely one possible example. In practical/real life systems, not all the LBT states may necessarily be available for the second network node. Instead, only some of the LBT states may be available.

In a "no LBT" state 501₁, the second network node is not performing any LBT procedures and hence no FLR are being measured/detected/logged or reported to the first net-work node. Accordingly, a measurement other than LFR needs to be used as condition to change LBT states. Such condition can be for example: BLER estimate based on ACK/NACKs, or OLLA offset.

A BLER estimate can be calculated as:

$$BLE_{est}=N_{nack}/(N_{ack}+N_{nack})$$

where: $N_{ack}$ is number of positively acknowledged transport blocks during an observation period, and $N_{nack}$ is number of negatively acknowledged transport blocks during the obser-vation period.

In downlink, the gNB (or gNB-DU) can do BLER estimation based on ACK/NACKs received from a UE or alternatively a UE can follow and report the estimate. A gNB estimate would be more accurate because the gNB has accurate knowledge of the transmissions and hence can also take into account the cases where a Physical Downlink Control Channel, PDCCH, reception fails. On the other hand, gNB estimate would contain errors in ACK/NACK reception.

In uplink, the gNB can also do the estimation based on received data. Where transmissions are scheduled, the gNB should also have knowledge of transmissions except for cases where a DL grant reception has failed.

A UE has accurate information of its transmitted blocks, so a BLER report from the UE could also be used.

It has been shown that if beamforming with very narrow beams is used, then the use of LBT may not give much/any benefit for the majority of UE positions. In such cases, beamforming itself, as such, is sufficient as channel access method to avoid/reduce interference and increase reliability. Hence, the necessity of using LBT may depend on beamforming parameters, such as the beamwidth. In a system with very narrow beamwidth, the "No LBT"/disabled LBT state could be used as default starting state, $501_1$. An enabled LBT state could be "Directional LBT" $501_2$ or "Omnidirectional LBT" $501_3$ (e.g., similar to that used for legacy WLAN systems) or "Quasi-omnidirectional LBT" (not shown).

In decision block 502, if it is determined that a $BLER_{est}$ is below a threshold $T_{bler}$, then a decision is made to keep the LBT state as "No LBT" $501_1$. However, if it is determined that a $BLER_{est}$ is above the threshold $T_{bler}$, then a decision is made to enable LBT, namely enable "Directional LBT" state $501_2$.

In this example, $BLER_{est}$ is used as the measurement condition for effecting state changes. In other examples, other metrics may be used as the measurement condition, e.g., OLLA offset. For instance, if it is determined that a value indicative of OLLA offset, $OLLA_{est}$, is below a threshold $T_{olla}$, then a decision is made to keep the LBT state as "No LBT" $501_1$. However, if it is determined that $OLLA_{est}$ is above the threshold $T_{olla}$, then a decision is made to enable LBT, namely enable "Directional LBT" state $501_2$.

Having enabled an LBT state, namely "Directional LBT" $501_2$, LBT measurements, failures and LFR are measured, logged and reported.

In decision block 503, if it is determined that a reported LFR is below a threshold T1, then a decision is made to transition the LBT state back to "No LBT" $501_1$. However, if it is determined that LFR is above T1, the flow moves to decision block 504, wherein if it is determined that a $BLER_{est}$ is below a threshold $T_{bler}$ (or that $OLLA_{est}$ is below a threshold $T_{olla}$), then a decision is made to keep the LBT state as "Directional LBT" $501_2$. However, if it is determined that a $BLER_{est}$ is above the threshold $T_{bler}$, then a decision is made to transition to "Omnidirectional LBT" state $501_3$.

In decision block 505, if it is determined that a reported LFR is below a threshold T2, then a decision is made to transition the LBT state back to "No LBT" $501_1$. However, if it is determined that LFR is above T2, then a decision is made to remain in "Omnidirectional LBT" state $501_3$.

When in any (omnidirectional, quasi-omnidirectional or directional) LBT state, if the LBT failure rate drops below a predetermined value (e.g., threshold T1 or T2) this can be an indication of a very low load in the network and LBT can be disabled, i.e., transitioned to "No LBT" state $501_1$. An omnidirectional/quasi-omnidirectional LBT state may be over-cautious with regards to interference so a LFR can be assumed to be higher. Hence, the threshold T2 can be higher than T1 (it could be even significantly higher).

If in "Directional LBT" state and the $BLER_{est}$ (or $OLLA_{est}$) still remains high, then there may be interference that the directional LBT does not sense correctly. Hence, there may be a reason to enable an "Omnidirectional LBT" state and/or a receiver-assisted LBT.

Figure 6:
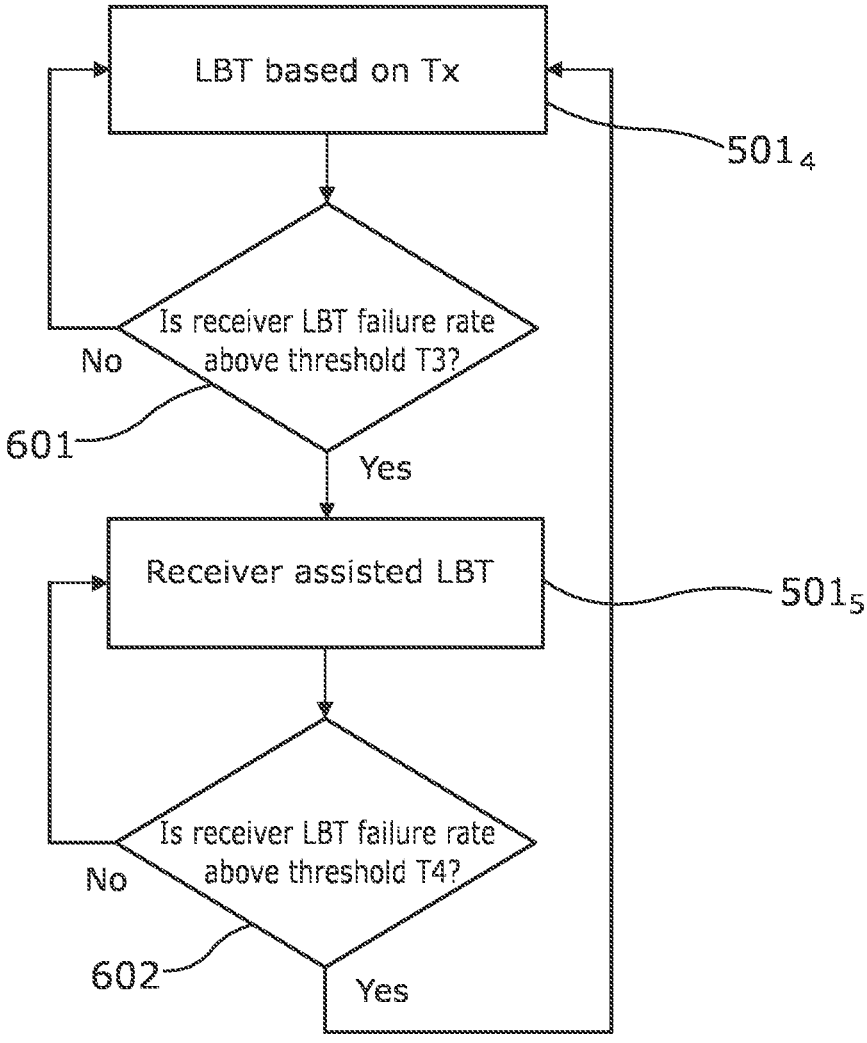
FIG. 6 shows another example of the subject matter described herein.

FIG. 6 illustrates an example of possible state changes with regards to receiver-assisted LBT. These state changes can be done in addition to the state changes of FIG. 5.

In this example, LFR is used as the measurement condition for effecting state changes. In other examples, other metrics may be used as the measurement condition, e.g., based on BLER or OLLA offset.

In an initial state $501_4$, the second node (i.e., the gNB-DU or UE) acting as a transmitter, is in an "LBT based on Tx", i.e., a transmission only LBT state (in contradistinction to a receiver assisted LBT state).

In decision block 601, it is determined whether the receiver's LFR exceeds a certain threshold T3. If so, it is decided that "receiver assisted LBT" $501_5$ should be enabled (since this is indicative that the receiver is sensing a lot of interference and hence that receiver assisted LBT should be used). If the receiver's LFR does not exceed the threshold T3, then it is decided that the LBT state should remain as "LBT based on Tx" $501_4$.

In decision block 602, it is determined whether the receiver's LFR exceeds a certain threshold T4. If so, then it is decided that the LBT state should remain as "receiver assisted LBT" $501_5$. If the receiver's LFR does not exceed the threshold T4, it is decided that the LBT state should revert to "LBT based on Tx" $501_4$.

T3 is the receiver LFR threshold for enabling receiver assisted LBT. T4 is receiver LFR threshold for disabling receiver assisted LBT. Hence T4 is to be a lower (possible significantly lower) value than T3.

Thresholds for changing states, T3 and T4, can be the same or they can be different in case some hysteresis is desired. It may be preferable for there to be a clear difference in thresholds to avoid a 'ping-pong' effect.

The example of FIG. 6 can be combined with the example of FIG. 5 so that in each LBT state of FIG. 5, a receiver assisted LBT state can be switched on if the criterion of FIG. 6 is met.

An alternative to using the receiver LFR, is to compare LFR of the receiver and the LFR of the transmitter. This can be done, e.g., by calculating ratio of receiver and transmitter LBT failure rates:

$$R = LFIR_{rx}/LFR_{tx}$$

where $LFR_{rx}$ is receiver LFR rate and LFR, is transmitter LFR.

Values of this ratio can be compared against a threshold value Tr. If the ratio value exceeds the threshold, this is indicative that the receiver is sensing more interference than the transmitter, and hence that receiver-assisted LBT should be used.

In the description above, engineered decision-making and state-transition processes have been described, i.e., deterministic mechanism and condition(s) to control switching between channel access with LBT and channel access without LBT. In an alternative implementation, the state transition decision could utilise machine learning. For example, the problem can be considered as being of a "multi-armed bandit" type to which various solution approaches have been developed over the years. "Multi-armed bandit" describes a kind of problem, where an agent is confronted with various actions to choose from so as to maximize the expect reward.

In order to use a machine learning algorithm for a "multi-armed bandit" type of problem, one needs to define an "action space" and "reward".

With regards to "action space", this could correspond to the different LBT states/access methods, i.e., the decision for a particular transmission to use: no LBT, directional LBT, omnidirectional LBT, quasi-omnidirectional LBT and in addition whether or not also to activate receiver-assisted LBT.

With regards to "reward", for the ML agent to understand which action, i.e., which LBT state is suitable, there needs to be a reward in response to each action taken.

The reward could be throughput-based. Typically, the primary target is to achieve the highest possible throughput. Accordingly, the reward should include a representation of throughput, e.g., a size of a transmitted packet divided by the time spent on the transmission, including all mode-dependent LBT overhead. In this regard, no-LBT would always be the preferred access method. If the receiver did not respond with an ACK, the reward should be negative, indicating that the chosen access method was probably not suitable/optimal, i.e., that some (more protective) form of LBT should have been used.

The reward could be delay-based. One could operate the system directly on the basis of the time it takes to deliver the packet successfully. That is, the reward is e.g., inversely proportional to the time spent to transmit the packet (including all mode-dependent LBT overhead). If the receiver responded with a NACK or DTX, i.e., no feedback, this time could include an (expected) HARQ round trip time, thereby penalizing a decision to transmit in an inopportune moment. If there are stringent latency requirements defined for the given traffic type/flow, the penalty in case of NACK/DTX could also be determined based on a comparison between the latency requirement and the time spent on the transmission attempt.

Optionally, a small penalty may be awarded for each LBT failure, in order to penalize excessive use of LBT in situations, where it is not needed.

Other reward designs can be based on some other measurement of throughput, transmission success or delay or other criteria.

The ML algorithm may use approximate solution approaches in the form of "semi-uniform strategies", such as the "E-greedy strategy" and its variants. Here, exploitation, i.e., taking an "assumed-to-be-best action", is traded against exploration, i.e., trying other actions to see if they might be better, e.g., due to a change in circumstances, in a way that with probability ε a random action is chosen, while with probability (1−ε) the assumed-to-be-best action is chosen. Here, the "assumed-to-be-best action" is defined as the action that has in the past on average delivered the highest reward. The particular choice of E, or variation thereof over time, defines the variant of the c-greedy approach.

Another possible approach that can be used based on the same action and reward design is a "probability matching strategy", where the rate at which different actions are tested depends on the probability that the given action might actually be the optimal one.

Other strategies to solve a multi-armed-bandit problem may also be possible.

Such a machine learning process can be applied at various levels, e.g., per cell, per beam or per UE. In the latter case, requirements of the traffic can be taken into account to limit the allowed actions pre-emptively or to choose a reward design that matches the requirements, e.g., delay-based for URLLC vs. throughput-based for eMBB traffic.

For the ML-based approach, new messages can be introduced over the Uu interface (i.e., between gNB and UE) and over the F1 interface (between gNB-CU and gNB-DU). For example, for online reinforcement learning, there is a mixture of exploration and exploitation, i.e., the gNB would use different LBT modes with different probabilities to continuously explore which might currently be the best option. If the algorithm runs in the gNB-CU there could be the following information exchange:

gNB-CU→gNB-DU: rates or probabilities with which each LBT mode should be used in the DL from the gNB-DU. Those would be reflected into a vector with as many entries as LBT modes. These probabilities could be alternatively a fraction of time that each LBT mode is being used (when real probability cannot be calculated). For an LBT mode for which the gNB-CU does not want the gNB-DU to do any exploration, the gNB-CU would set this value to 0. As an alternative, the gNB-CU could send to the gNB-DU just a set of LBT modes that the gNB-DU is allowed to explore during a period of time. This configuration by the gNB-CU (in terms of probabilities or policies) is updated when the gNB-CU sends a new message to the gNB-DU.

gNB-CU→UE: the same information could be sent from the gNB-CU to UE to allow different LBT modes for the UL by the UE.

gNB-CU→gNB-DU and gNB-CU→UE: the gNB-CU needs to communicate to the gNB-DU and to UE what is the reward measure used and what are the units of it. For example, a reward measure would be whether the reward is based on delay, failure rates, etc. and how it is represented (a rate can be in [0,1] or in [0,100] scale, the delay can be measured in secs or ms. The gNB-DU calculates the reward obtained by using different LBT methods.

gNB-DU→gNB-CU: gNB-DU (periodically) reports the success/failure of using each LBT mode in gNB-DL. This basically comprises of (a vector of) the rewards accumulated for each mode over the reporting period (cf. reward definition above).

UE→gNB-CU: UE (periodically) reports the success/failure of using each LBT mode in UL.

Figure 7:
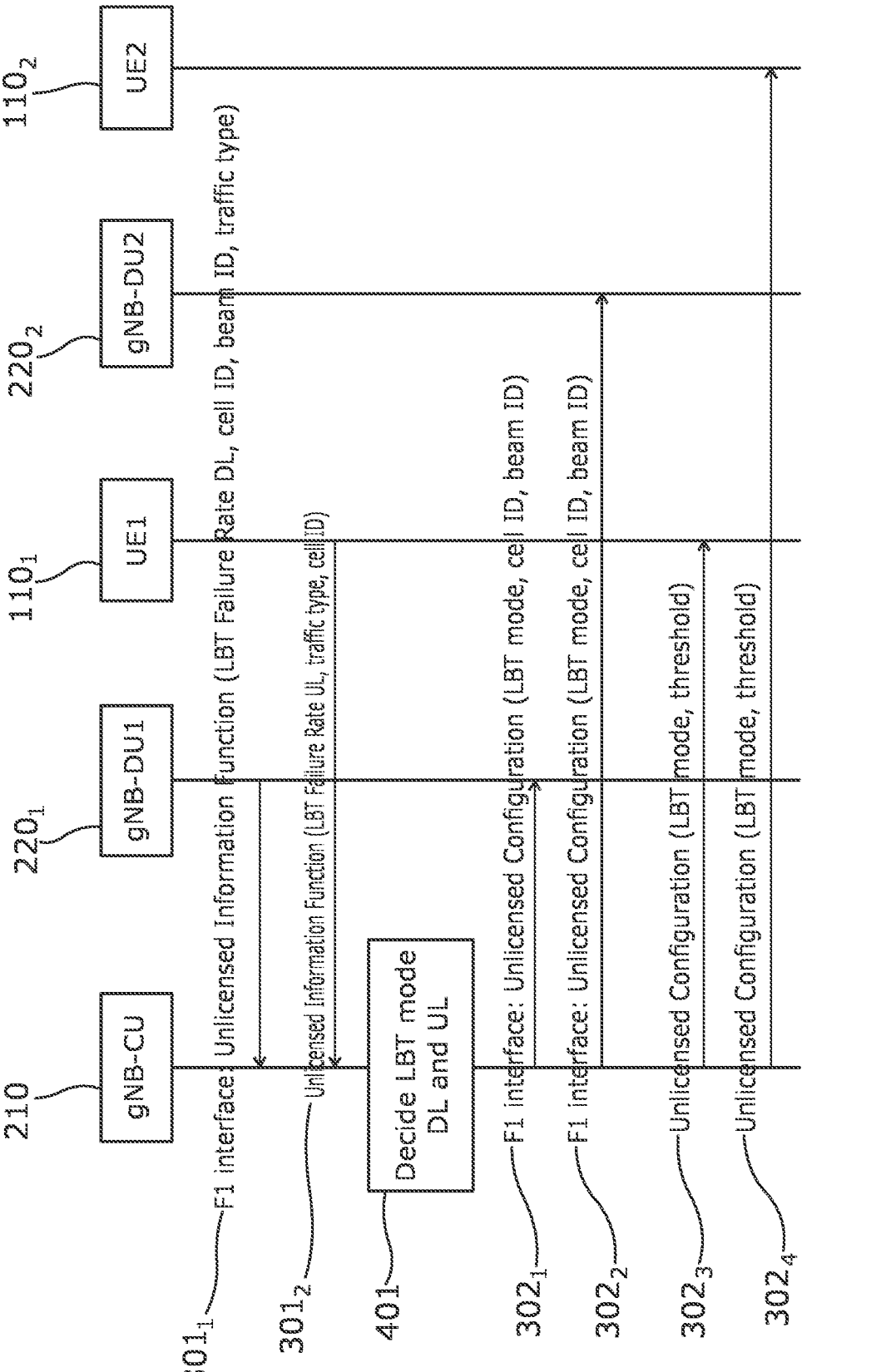
FIG. 7 shows another example of the subject matter described herein.

FIG. 7 is a further example of signaling between a gNB-CU 210, a first gNB-DU 220₁, a first UE 110₁ (i.e., similar to that of FIG. 4) but also further including signaling between the gNB-CU 210 and a second gNB-DU 220₂ and a second UE 110₂.

Signals 301₁, 301₂, decision block 401 as well as signals 302₁ and 302₂ are similar to those of FIG. 4 as discussed above.

In addition to effecting an adjustment of the LBT states of the first gNB-DU 220₁ and first UE 110₁ (i.e., the network nodes that send their LBR and additional information to the gNB-CU 210 via signaling 301₁ and 301₂), the gNB-CU 210 is also able to use the received LBR and additional information to adjust the LBT states of the second gNB-DU 220₂ and second UE 110₂.

In block 401, responsive to receipt of the LFR information and additional information (e.g., cell ID, beam ID and traffic type) from the first gNB-DU and the first UE, the gNB-CU decides which LBT mode/state the second gNB-DU and second UE should adopt.

The gNB-CU then generates and signals configuration information for triggering an LBT state transition (e.g., not least for example between omnidirectional LBT/quasi-omnidirectional LBT and directional LBT) or an adjustment of an LBT parameter (e.g., not least an adjustment of an LBT operational parameter such as relating to the energy level threshold for determining CCA) to the second gNB-DU and second UE.

The configuration information for effecting the determined LBT state adjustment/transition for the second gNB-DU is sent to the second gNB-DU in an "Unlicensed Configuration" message $302_3$ via F1 interface. The configuration information also includes information indicative of an LBT threshold parameter to be adjusted, e.g., related to an energy level threshold for CCA.

The configuration information for effecting the determined LBT state adjustment/transition for the second UE is sent to the second UE in an "Unlicensed Configuration" message 3024 over a Uu interface, e.g., via RRC singling. The configuration information also includes information indicative of an LBT threshold parameter to be adjusted, e.g., related to an energy level threshold for CCA.

Whilst FIG. 7 shows only a single first gNB-DU, a single first UE, it is to be appreciated that in some examples there may be a plurality of first gNB-DUs and a plurality of first UEs. Likewise, in some examples there may be a plurality of second gNB-DUs and a plurality of second UEs.

The signaling diagrams and flowcharts of FIGS. 3 to 7 each represent one possible scenario among others.

The blocks illustrated in FIGS. 3 to 7 are functional and the functions described may or may not be performed by a single physical entity (such as an apparatus described with reference to FIG. 8.

The blocks illustrated in FIGS. 3 to 7 can represent actions in a method, and/or sections of instructions/code in a computer program (such as described with reference to FIG. 9).

It will be understood that each block and combinations of blocks, can be implemented by various means, such as hardware, firmware, and/or software including one or more computer program instructions. For example, one or more of the procedures described above can be embodied by computer program instructions. In this regard, the computer program instructions which embody the procedures described above can be stored by a memory storage device and performed by a processor.

As will be appreciated, any such computer program instructions can be loaded onto a computer or other programmable apparatus (i.e., hardware) to produce a machine, such that the instructions when performed on the programmable apparatus create means for implementing the functions specified in the blocks. These computer program instructions can also be stored in a computer-readable medium that can direct a programmable apparatus to function in a particular manner, such that the instructions stored in the computer-readable memory produce an article of manufacture including instruction means which implement the function specified in the blocks. The computer program instructions can also be loaded onto a programmable apparatus to cause a series of operational actions to be performed on the programmable apparatus to produce a computer-implemented process such that the instructions which are performed on the programmable apparatus provide actions for implementing the functions specified in the blocks.

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure are described using signaling diagrams, flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e., such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e., the software or firmware) thereon for performing by the computer processor.

Figures 8, 9:
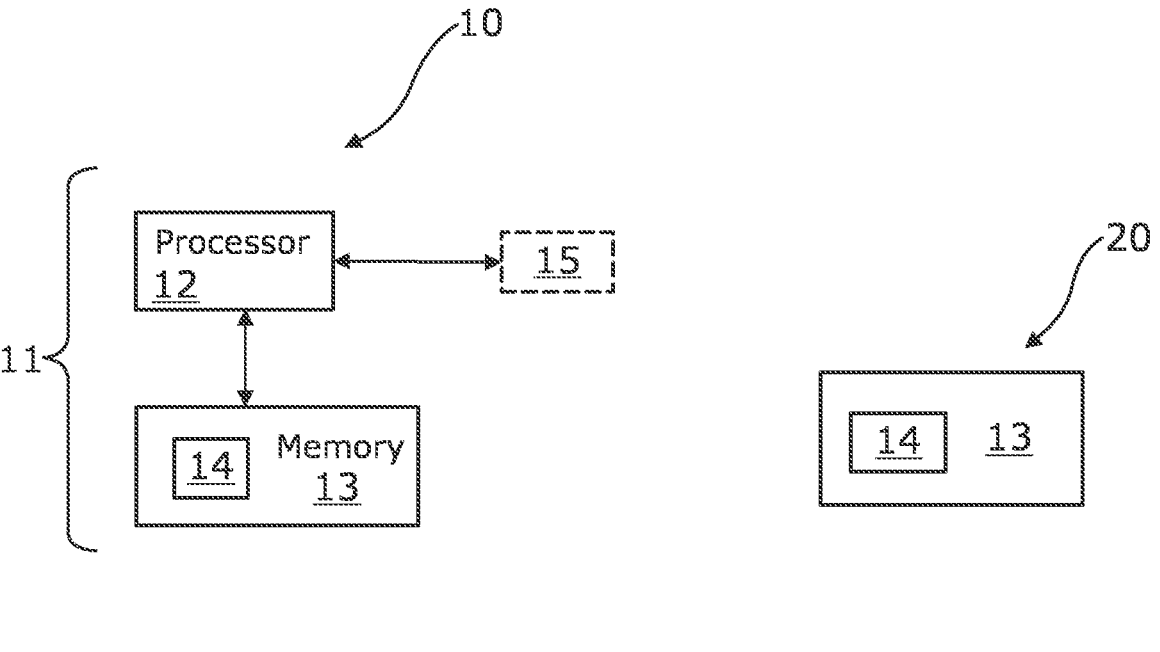
FIG. 8 shows another example of the subject matter described herein.
FIG. 9 shows another example of the subject matter described herein.

FIG. 8 schematically illustrates a block diagram of an apparatus 10 for performing the methods, processes, procedures and signaling described in the present disclosure and illustrated in FIGS. 3 to 7. The component blocks of FIG. 8 are functional and the functions described may or may not be performed by a single physical entity.

The apparatus comprises a controller 11, which could be provided within a device such as a RAN node 120, a gNB-CU 210, a gNB-DU 220 or UE 110. The controller 11 can be embodied by a computing device, not least such as those mentioned above. In some, but not necessarily all examples, the apparatus can be embodied as a chip, chip set or module, i.e., for use in any of the foregoing. As used here 'module' refers to a unit or apparatus that excludes certain parts/components that would be added by an end manufacturer or a user.

Implementation of the controller 11 may be as controller circuitry. The controller 11 may be implemented in hardware alone, have certain aspects in software including firmware alone or can be a combination of hardware and software (including firmware).

The controller 11 may be implemented using instructions that enable hardware functionality, for example, by using executable instructions of a computer program 14 in a general-purpose or special-purpose processor 12 that may be stored on a computer readable storage medium 13, for example memory, or disk etc, to be executed by such a processor 12.

The processor 12 is configured to read from and write to the memory 13. The processor 12 may also comprise an output interface via which data and/or commands are output by the processor 12 and an input interface via which data and/or commands are input to the processor 12. The apparatus may be coupled to or comprise one or more other components 15 (not least for example: a radio transceiver, sensors, input/output user interface elements and/or other modules/devices/components for inputting and outputting data/commands).

The memory 13 stores a computer program 14 comprising computer program instructions (computer program code) that controls the operation of the apparatus 10 when loaded into the processor 12. The computer program instructions, of the computer program 14, provide the logic and routines that enables the apparatus to perform the methods, processes and procedures described in the present disclosure and illustrated in FIGS. 3-7. The processor 12 by reading the memory 13 is able to load and execute the computer program 14.

Although the memory 13 is illustrated as a single component/circuitry it may be implemented as one or more separate components/circuitry some or all of which may be integrated/removable and/or may provide permanent/semi-permanent/dynamic/cached storage.

Although the processor 12 is illustrated as a single component/circuitry it may be implemented as one or more separate components/circuitry some or all of which may be integrated/removable. The processor 12 may be a single core or multi-core processor.

The apparatus may include one or more components for effecting the methods, processes and procedures described in the present disclosure and illustrated in FIGS. 3 to 7. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a node of a network, a RAN node, a gNB-CU, a gNB-DU, and a UE. The apparatus can be a base station in a mobile cellular telecommunication system, a server device, a client device, a mobile cellular telephone, a wireless communications device, a hand-portable electronic device, a location/position tag, a hyper tag etc. The apparatus can be embodied by a computing device, not least such as those mentioned above. However, in some examples, the apparatus can be embodied as a chip, chip set or module, i.e., for use in any of the foregoing.

In one example, the apparatus is embodied on a hand held portable electronic device, such as a mobile telephone, wearable computing device or personal digital assistant, that can additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions.

In some examples, the apparatus comprises comprising:

at least one processor 12; and at least one memory 13 including computer program code the at least one memory 13 and the computer program code configured to, with the at least one processor 12, cause the apparatus at least to perform:

receiving information indicative of a quality of a channel; and causing an adaptation of a Listen-Before-Talk state of at least one network node based, at least in part, on the received information.

The apparatus can be implemented in a centralized unit of an access node

In examples, the apparatus comprises comprising:

at least one processor 12; and at least one memory 13 including computer program code the at least one memory 13 and the computer program code configured to, with the at least one processor 12, cause the apparatus at least to perform:

sending information indicative of a quality of a channel to a centralized unit of an access node;

receiving, responsive to sending the information, control information for adaptation of a Listen-Before-Talk state of the node; and adapting the Listen-Before-Talk state of the node based at least in part on the received control information.

The apparatus can be implemented in a distributed unit of an access node or a UE. where the apparatus is implemented in a UE, the UE may be configured for one or more the following purposes:

to provide periodic deterministic communication;

to provide monitoring results for one or more industrial wireless sensors;

to provide a node in the Industrial Internet of Things;

to provide 3GPP ultra reliable low latency communication;

to provide real-time sensor measurements;

to provide a component of a transport automation system and/or;

to provide a component of a factory automation system.

According to some examples of the present disclosure, there is provided a system comprising: a centralized unit, distributed unit and UE as described above.

The above described examples find application as enabling components of: telecommunication systems; tracking systems, automotive systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

FIG. 9, illustrates a computer program 14. The computer program may arrive at the apparatus 10 via any suitable delivery mechanism 20. The delivery mechanism 20 may be, for example, a machine readable medium, a computer-readable medium, a non-transitory computer-readable storage medium, a computer program product, a memory device, a solid-state memory, a record medium such as a Compact Disc Read-Only Memory (CD-ROM) or a Digital Versatile Disc (DVD) or an article of manufacture that comprises or tangibly embodies the computer program 14. The delivery mechanism may be a signal configured to reliably transfer the computer program. The apparatus 10 may receive, propagate or transmit the computer program as a computer data signal.

In certain examples of the present disclosure, there is provided computer program instructions for causing a centralized unit of an access node to perform at least the following or for causing performing at least the following:

receiving information indicative of a quality of a channel; and causing an adaptation of a Listen-Before-Talk state of at least one network node based, at least in part, on the received information.

In certain examples of the present disclosure, there is provided computer program instructions for causing a distributed unit of an access node or a UE to perform at least the following or for causing performing at least the following:

sending information indicative of a quality of a channel to a centralized unit of an access node;

receiving, responsive to sending the information, control information for adaptation of a Listen-Before-Talk state of the node; and adapting the Listen-Before-Talk state of the node based at least in part on the received control information.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Although specific terms are employed herein, they are used in a generic and descriptive sense only and not for purposes of limitation.

Features described in the preceding description can be used in combinations other than the combinations explicitly described.

Although functions have been described with reference to certain features, those functions can be performable by other features whether described or not. Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

As used herein, the term "determine/determining" (and grammatical variants thereof) can include, not least: calculating, computing, processing, deriving, measuring, investigating, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

References to a parameter can be replaced by references to "data indicative of", "data defining" or "data representative of" the relevant parameter if not explicitly stated.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art.

Each and every claim is incorporated as further disclosure into the specification and the claims are embodiment(s) of the present invention. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

What is claimed is:

1. A centralized unit of an access node for use in a network comprising at least the centralized unit and a distributed unit, the centralized unit comprising:

one or more processors; and a memory storing one or more instructions that, when executed by the one or more processors, cause the centralized unit to:

receive, from the distributed unit via an Unlicensed Information Function message over an F1 interface, information indicative of a quality of a channel while the distributed unit is operating in a Listen-Before-Talk state, wherein the received information comprises a Block Error Rate (BLER) estimate calculated from Hybrid Automatic Repeat Request (ARQ) Acknowledgement (ACK) and Negative Acknowledgement (NACK) feedback for transport blocks and a Listen-Before-Talk Failure Rate (LFR) indicative of the quality of the channel;

determine that the BLER estimate is greater than a first threshold Tbler;

based on determining that the BLER estimate is greater than the first threshold Tbler, cause the distributed unit to transition from a disabled Listen-Before-Talk state to a directional Listen-Before-Talk state;

determine that the BLER estimate is greater than a second threshold Tbler2 while the LFR is greater than a first LFR threshold T1;

based on determining that the BLER estimate is greater than the second threshold Tbler2 while the LFR is greater than the first LFR threshold T1, cause the distributed unit to transition from the directional Listen-Before-Talk state to an omnidirectional Listen-Before-Talk state;

determine that the LFR has fallen below a second LFR threshold T2; and based on determining that the LFR has fallen below the second LFR threshold T2, cause the distributed unit to transition from the omnidirectional Listen-Before-Talk state to the disabled Listen-Before-Talk state.

2. A method for use in a centralized unit of an access node for use in a network comprising at least the centralized unit and a distributed unit, the method comprising:

receiving, from the distributed unit via an Unlicensed Information Function message over an F1 interface, information indicative of a quality of a channel while the distributed unit is operating in a Listen-Before-Talk state, wherein the received information comprises a Block Error Rate (BLER) estimate calculated from Hybrid Automatic Repeat Request (ARQ) Acknowledgement (ACK) and Negative Acknowledgement (NACK) feedback for transport blocks and a Listen-Before-Talk Failure Rate (LFR) indicative of the quality of the channel;

determining that the BLER estimate is greater than a first threshold Tbler;

based on determining that the BLER estimate is greater than the first threshold Tbler, causing the distributed unit to transition from a disabled Listen-Before-Talk state to a directional Listen-Before-Talk state;

determining that the BLER estimate is greater than a second threshold Tbler2 while the LFR is greater than a first LFR threshold T1;

based on determining that the BLER estimate is greater than the second threshold Tbler2 while the LFR is greater than the first LFR threshold T1, causing the distributed unit to transition from the directional Listen-Before-Talk state to an omnidirectional Listen-Before-Talk state;

determining that the LFR has fallen below a second LFR threshold T2; and based on determining that the LFR has fallen below the second LFR threshold T2, causing the distributed unit to transition from the omnidirectional Listen-Before-Talk state to the disabled Listen-Before-Talk state.

3. A non-transitory computer readable medium encoded with instructions that, when performed by at least one processor, causing a centralized unit of an access node for use in a network comprising at least the centralized unit and a distributed unit to perform at least:

receiving, from the distributed unit via an Unlicensed Information Function message over an F1 interface, information indicative of a quality of a channel while the distributed unit is operating in a Listen-Before-Talk state, wherein the received information comprises a Block Error Rate (BLER) estimate calculated from Hybrid Automatic Repeat Request (ARQ) Acknowledgement (ACK) and Negative Acknowledgement (NACK) feedback for transport blocks and a Listen-Before-Talk Failure Rate (LFR) indicative of the quality of the channel;

determining that the BLER estimate is greater than a first threshold Tbler;

based on determining that the BLER estimate is greater than the first threshold Tbler, causing the distributed unit to transition from a disabled Listen-Before-Talk state to a directional Listen-Before-Talk state;

determining that the BLER estimate is greater than a second threshold Tbler2 while the LFR is greater than a first LFR threshold T1;

based on determining that the BLER estimate is greater than the second threshold Tbler2 while the LFR is greater than the first LFR threshold T1, causing the distributed unit to transition from the directional Listen-Before-Talk state to an omnidirectional Listen-Before-Talk state;

determining that the LFR has fallen below a second LFR threshold T2; and based on determining that the LFR has fallen below the second LFR threshold T2, causing the distributed unit to transition from the omnidirectional Listen-Before-Talk state to the disabled Listen-Before-Talk state.

* * * * *